H. C. MASTERSON.
HAY RAKE.
APPLICATION FILED AUG. 5, 1915.
1,188,190.
Patented June 20, 1916.
2 SHEETS—SHEET 1.
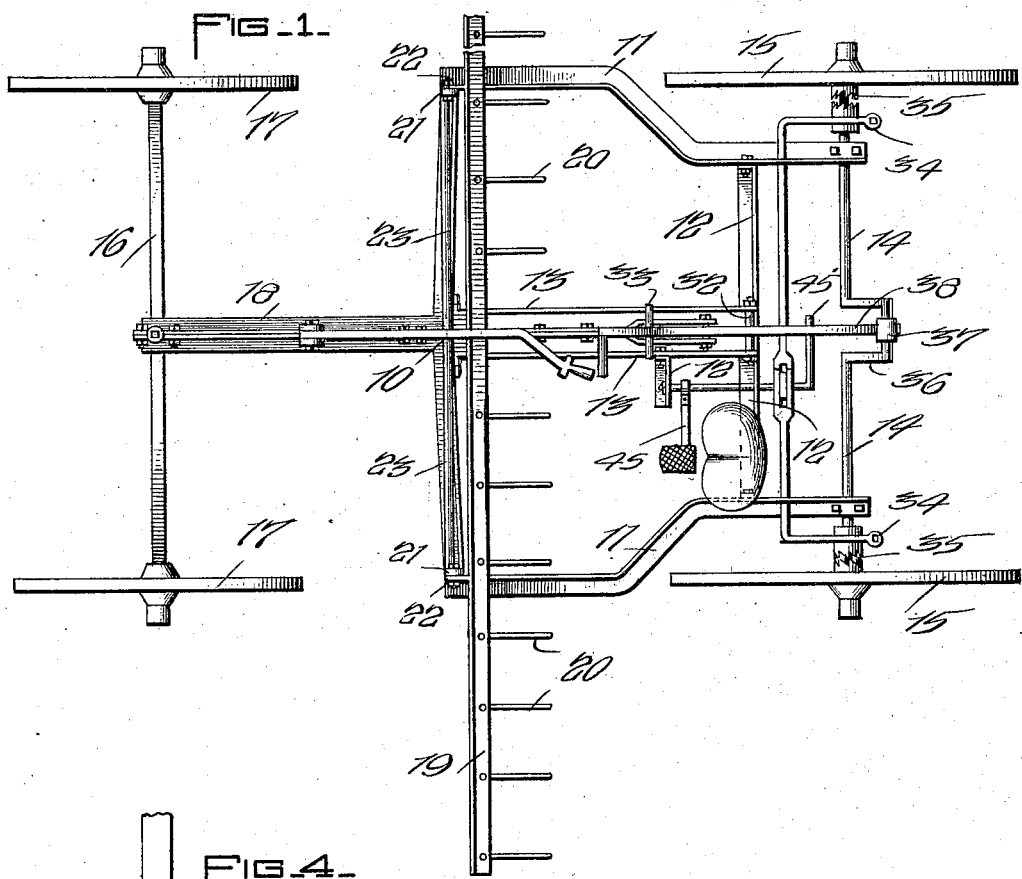
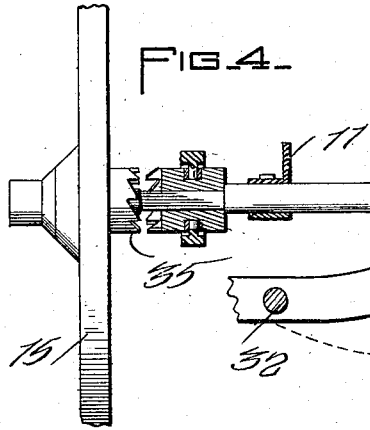
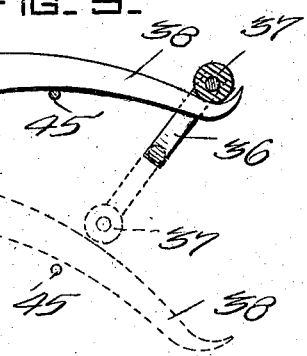
WITNESSES:
INVENTOR
HARRY C. MASTERSON,
BY
ATTORNEYS

H. C. MASTERSON.
HAY RAKE.
APPLICATION FILED AUG. 5, 1915.

1,188,190.

Patented June 20, 1916.
2 SHEETS—SHEET 2.

WITNESSES:

INVENTOR
HARRY C. MASTERSON,
BY Munn & Co.
ATTORNEYS

UNITED STATES PATENT OFFICE.

HARRY CHARLES MASTERSON, OF CLE ELUM, WASHINGTON.

HAY-RAKE.

1,188,190.  Specification of Letters Patent.  Patented June 20, 1916.

Application filed August 5, 1915. Serial No. 43,772.

*To all whom it may concern:*

Be it known that I, HARRY C. MASTERSON, a citizen of the United States, and a resident of Cle Elum, in the county of Kittitas and State of Washington, have invented an Improvement in Hay-Rakes, of which the following is a specification.

This invention is an improvement in hay rakes, and has particular reference to adjusting devices therefor.

An object of the invention is the provision of a rake carrying vehicle having a mechanism mounted thereon and automatically operated by the travel of the vehicle to adjust the rake in order to dump the contents thereof, said mechanism being adapted to be manually thrown into and out of clutching engagement with certain of the wheels at the will of the operator.

Another object is to provide a means for vertically adjusting the rake to accommodate the same to uneven ground and to make said rake of a width considerably more than that of the vehicle so that the hay lying close to fences and like structures may be easily gathered without endangering the vehicle or said structures as the result of a collision therebetween.

The invention idea involved is capable of receiving a variety of mechanical expressions, one of which, for the purpose of illustrating the invention, is shown in the accompanying drawings, in which—

Figure 2:
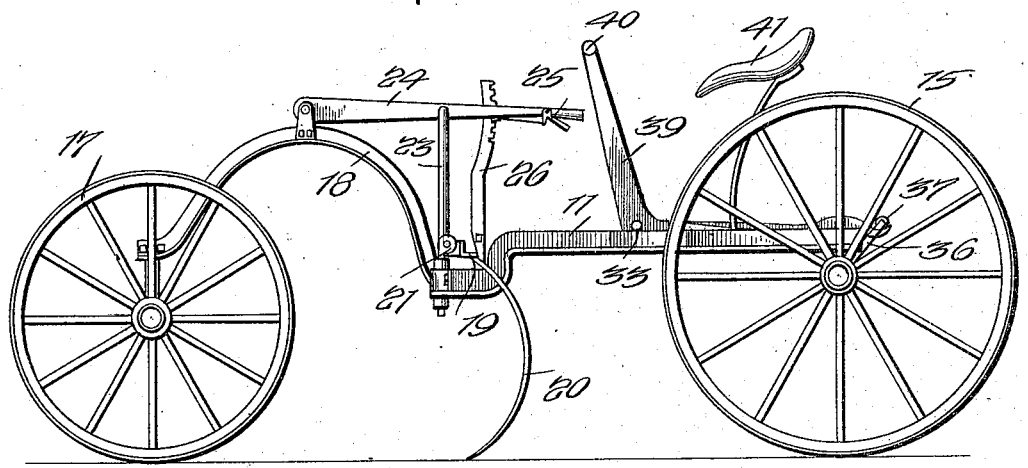
Figure 3:
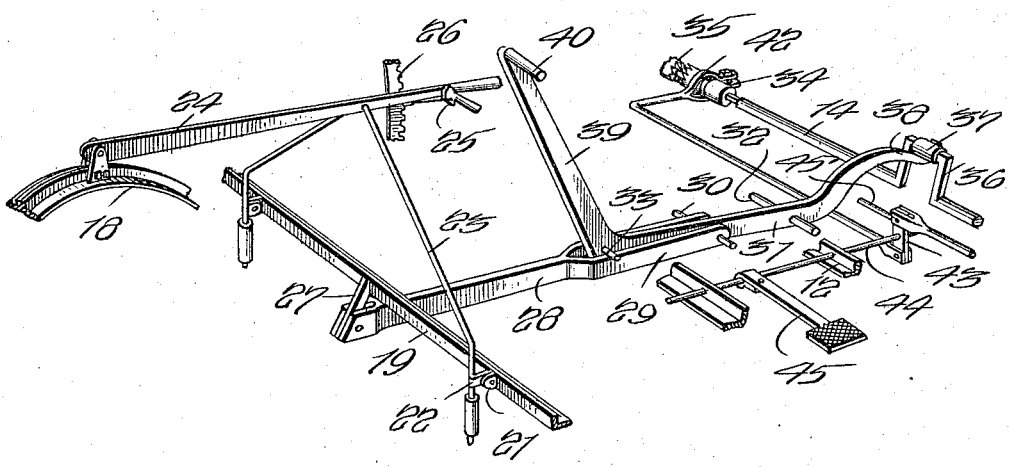

Figure 1 is a top plan view of the rake carrying vehicle constructed in accordance with the invention. Fig. 2 is a side elevation thereof. Fig. 3 is a fragmentary perspective of the adjusting devices for the rake element, parts being broken away. Fig. 4 is a fragmentary elevation of the rear axle of the vehicle showing in section a portion of the clutch mechanism used in connection therewith. Fig. 5 is a fragmentary view partly in section of the rake adjusting lever and the means for actuating the same.

Referring more particularly to the accompanying drawings the numeral 10 indicates generally the frame of the vehicle preferably formed of angle iron and consisting of side members 11 connected by a cross brace 12, the latter having secured thereto intermediate its ends the parallel braces 13 which extend longitudinally of the frame. The frame also has mounted therein the rear axle 14 provided with wheels 15 and a front axle 16 having wheels 17. The front axle is connected to the frame of the vehicle by means of an arcuate member 18 commonly known as a "gooseneck" and employed for the purpose of permitting a short turning of the vehicle and relieving considerable strain on the draft animal.

A rake bar 19 is mounted transversely of the frame and the ends thereof project beyond the sides of the said frame so that hay near fences and the like may be easily gathered and said bar has depending therefrom a plurality of teeth 20. The bar 19 is provided with inwardly extending ears 21 which are pivoted to similar ears 22 carried by rods 23 adjacent the lower ends thereof, said rods converging upwardly and being connected to a lever 24 pivoted at one end to the member 18 and having a pawl 25 at its other end adapted for engagement with the vertically arranged rack 26 whereby said lever may be retained in an adjusted position. From this description it will be seen that by actuating the lever 24 the raking elements may be raised or lowered to accommodate the same to uneven ground.

Extending diagonally from the central portion of the rake bar 19 is a short arm 27 to the free end of which is connected one end of a rearwardly extending supporting element 28 the other end thereof being bifurcated as indicated at 29 and having a pivot 30 passing through the ends thereof, said pivot having mounted thereon an angular operating lever 31. This lever 31 is also pivotally connected at 32 to the extremity of the braces 13 adjacent the brace 12. In order to retain the lever in the position illustrated in Fig. 3 the same is provided with the pin 33 which rests upon the top of the bifurcation 29. From the structure just described it will be apparent that when the lever 31 is actuated, in a manner to be presently described, the same will swing about a fixed pivot 32 and will draw the supporting member 28 rearwardly thus rocking the bar 19 about the pivots 21 and lifting the teeth 20 from the ground whereby any accumulation of hay may be readily dumped.

The mechanism for operating the lever 31 to rock the raking elements comprises a pair of clutch members 34 slidably mounted in the ends of the rear axle 14, said clutch members being adapted to engage the teeth 35 formed upon the inner ends of the hubs of the wheels 15. Intermediate the ends of the axle 14 the same is provided with a crank 36 having a roller 37 mounted thereon and adapted to engage the hooked end 38 of the lever 31. When the clutches 34 and 35 are thrown into engagement with each other, in a manner to be presently described, the axle 14 will rotate and thus cause the roller 37 to ride along the top of the lever 31 and thereby depress the same to the dotted line position shown in Fig. 5, causing said lever to rock about its pivot 32 and thereby exert a pull on the supporting member 28. Said lever 31 is provided with an upward extension 39 having a handle 40 within easy reach of the driver's seat 41 so that the operator may grasp said handle and manually operate the mechanism just described, should it be desired.

The clutch shifting device comprises a yoke 42 associated with each of the clutches 34, said yokes having transverse rods extending toward each other and pivoted to the cross piece 43 at their inner ends. This cross piece is secured upon a rock shaft 44 mounted in the transverse braces 12 of the frame 10. A foot treadle 45 is secured to the rock arm whereby the latter may be easily rotated to throw the clutches 34 into and out of engagement with the clutches 35.

When the rock shaft 44 is operated to throw the clutches into engagement the lateral extension 45' of said shaft is thrown upwardly toward the hooked end 38 of the lever 31 so that when the same is depressed as previously described this extension 45 will be engaged and pushed downwardly, thus returning the rock shaft to its normal position and throwing clutches 34 out of engagement. It will thus be seen that there is provided an automatic means for intermittently actuating the rake to dump the contents thereof.

I claim:—

In a rake, the combination of a wheeled frame, an axle having a crank portion, an operating lever having a projection intermediate its ends and also having one end adapted to loosely contact said crank portion, pivoted raking elements associated with said frame, a support pivoted to said lever and on which said projections rest, said support being also connected to said raking elements, and means for rotating said axle whereby said crank portion will operate said lever and support to rock said raking elements about their pivots.

HARRY CHARLES MASTERSON.

Witnesses:
J. L. CARPENTER,
J. J. KASHWINKOV.